(12) United States Patent
Miwa

(10) Patent No.: US 11,046,255 B2
(45) Date of Patent: Jun. 29, 2021

(54) SENSOR MOUNTING STRUCTURE

(71) Applicant: TOYOTA JIDOSHA KABUSHIKI KAISHA, Toyota (JP)

(72) Inventor: Masaki Miwa, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 147 days.

(21) Appl. No.: 16/265,174

(22) Filed: Feb. 1, 2019

(65) Prior Publication Data
US 2019/0256009 A1 Aug. 22, 2019

(30) Foreign Application Priority Data

Feb. 20, 2018 (JP) .............................. JP2018-027554

(51) Int. Cl.
| | |
|---|---|
| *B60R 19/00* | (2006.01) |
| *B60R 11/00* | (2006.01) |
| *G01S 7/521* | (2006.01) |
| *G01S 13/931* | (2020.01) |
| *G01S 15/931* | (2020.01) |
| *B60R 19/48* | (2006.01) |
| *G01S 7/02* | (2006.01) |

(52) U.S. Cl.
CPC ............ *B60R 11/00* (2013.01); *B60R 19/483* (2013.01); *G01S 7/521* (2013.01); *G01S 13/931* (2013.01); *G01S 15/931* (2013.01); *B60R 2011/004* (2013.01); *B60R 2011/0045* (2013.01); *G01S 2007/027* (2013.01); *G01S 2013/9324* (2020.01); *G01S 2013/93274* (2020.01); *G01S 2013/93275* (2020.01); *G01S 2015/937* (2013.01)

(58) Field of Classification Search
CPC .............................. B60R 11/00; B60R 19/483
See application file for complete search history.

(56) References Cited

U.S. PATENT DOCUMENTS

| | | | |
|---|---|---|---|
| 2007/0200692 A1* | 8/2007 | Kamel | ...................... G01L 1/16 340/436 |
| 2009/0001759 A1* | 1/2009 | Kondo | .................. B60R 19/483 296/187.03 |
| 2012/0000302 A1* | 1/2012 | Inoue | ...................... G01S 7/521 73/866.5 |
| 2012/0200121 A1 | 8/2012 | Wuerfel | |

(Continued)

FOREIGN PATENT DOCUMENTS

| | | |
|---|---|---|
| DE | 102009057825 A1 | 6/2011 |
| DE | 102015224924 A1 | 6/2017 |

(Continued)

*Primary Examiner* — Steven M Marsh
(74) *Attorney, Agent, or Firm* — Oliff PLC

(57) ABSTRACT

There is provided a sensor mounting structure for a sensor having a detection surface configured to detect information around a vehicle. The sensor mounting structure includes an exterior member of the vehicle provided with an opening that is provided to be wider than an outer shape of the detection surface, and a cover disposed around the detection surface to close a space between an outer peripheral edge of the detection surface and an opening edge of the opening. The opening is provided such that then opening edge of the opening is disposed around the detection surface with a space between the opening edge and the detection surface.

9 Claims, 5 Drawing Sheets

(56) References Cited

U.S. PATENT DOCUMENTS

| | | | |
|---|---|---|---|
| 2013/0050034 A1 | 2/2013 | Wu et al. | |
| 2014/0158731 A1 | 6/2014 | Squire et al. | |
| 2016/0282155 A1 | 9/2016 | Hara | |
| 2017/0297521 A1* | 10/2017 | Sugie | B60K 11/08 |
| 2018/0203110 A1* | 7/2018 | Watanabe | G01S 7/03 |
| 2019/0162845 A1* | 5/2019 | Yasui | G01S 15/931 |
| 2019/0366963 A1* | 12/2019 | Kumashiro | H05K 9/002 |
| 2020/0096612 A1* | 3/2020 | Otoyo | G01S 7/4813 |

FOREIGN PATENT DOCUMENTS

| | | |
|---|---|---|
| EP | 3 118 065 A1 | 1/2017 |
| JP | 2016-179752 A | 10/2016 |

\* cited by examiner

SENSOR MOUNTING STRUCTURE

INCORPORATION BY REFERENCE

The disclosure of Japanese Patent Application No. 2018-027554 filed on Feb. 20, 2018 including the specification, drawings and abstract is incorporated herein by reference in its entirety.

BACKGROUND

1. Technical Field

The present disclosure relates to a sensor mounting structure.

2. Description of Related Art

In the related art, a sensor mounting structure for a sensor having a detection surface configured to detect information around a vehicle is known (for example, Japanese Unexamined Patent Application Publication No. 2016-179752 (JP 2016-179752 A)).

The sensor of the sensor mounting structure is mounted on an apron upper member and is disposed inside a fender panel. An opening is formed at a position on the fender panel facing the sensor, and a cover for covering the sensor is disposed at the opening. The cover is configured to transmit the signal detected by the sensor.

SUMMARY

Here, in the sensor mounting structure in the related art as described above, since the cover for covering the sensor is disposed at the opening of the fender panel, there is a possibility that the signal attenuates as the signal passes through the cover and the sensitivity is reduced. Therefore, it is conceivable to dispose the detection surface of the sensor at the opening of the fender panel and to expose the detection surface to the outside.

However, when the detection surface is disposed at the opening, in order to form the detection surface so as to conform to the shape of the opening, a sensor corresponding to the shape of the opening is needed, which may lead to an increase in product number. On the other hand, in order to provide the opening so as to conform to the shape of the detection surface, the shape of the opening is determined by the shape of the detection surface, which may lead to a decrease in the degree of freedom of design.

The present disclosure provides a sensor mounting structure capable of suppressing the decrease in the degree of freedom of design and suppressing the increase in the product number of the sensor.

An aspect of the present disclosure relates to a sensor mounting structure for a sensor having a detection surface configured to detect information around a vehicle. The sensor mounting structure includes an exterior member of the vehicle provided with an opening that is provided to be wider than an outer shape of the detection surface, and a cover disposed around the detection surface to close the space between an outer peripheral edge of the detection surface and an opening edge of the opening. The opening is provided such that the opening edge of the opening is disposed around the detection surface with the space between the opening edge and the detection surface.

According to the aspect of the present disclosure, since the detection surface is disposed in the opening and thus the detection surface is exposed to the outside, it is possible to suppress a reduction in sensitivity. Further, by making the opening wider than the outer shape of the detection surface and closing the space between the outer peripheral edge of the detection surface and the opening edge of the opening with the cover, it is not necessary to match the shape of the detection surface with the opening. Therefore, the common sensor can be used, and accordingly, the increase in the product number of the sensor can be suppressed. In addition, since the opening can be provided in a desired shape regardless of the shape of the detection surface, it is possible to suppress a decrease in the degree of freedom of design.

In the sensor mounting structure according to the aspect, the opening may be disposed around the detection surface of the sensor attached to a body of the vehicle.

According to the aspect, since the sensor is fixed to the body having high rigidity, vibration of the sensor can be suppressed.

In the sensor mounting structure according to the aspect, the cover may be provided to conform to the detection surface.

According to the aspect, since no step is formed at the boundary between the detection surface and the cover, the detection surface and the cover are readily viewed as a single body, which makes it possible to improve design quality.

In the sensor mounting structure according to the aspect, the cover may be provided to be inclined toward the opening edge of the opening from the outer peripheral edge of the detection surface.

According to the aspect, since the step at the boundary between the cover and the exterior member is suppressed, it is possible to smoothen the outer shape.

In the sensor mounting structure according to the aspect, a color of the cover and a color of the detection surface may be the same (in this specification, "the same" includes "substantially the same" in its meaning) or similar to each other.

According to the aspect, since the detection surface and the cover are readily viewed as a single body, it is possible to improve design quality.

In the sensor mounting structure according to the aspect, the cover may be provided in a plate shape, the cover may include a hole into which the sensor is inserted, and the cover may be attached to the sensor through the hole.

According to the aspect, since the cover is fixed to the sensor, it is possible to suppress vibration of the cover.

In the sensor mounting structure according to the aspect, the cover may include an inner portion that is exposed from the opening and an outer portion that faces an inner surface of the exterior member, and the cover may include a sealing member that is disposed between the outer portion of the cover and the inner surface of the exterior member.

According to the aspect, it is possible to suppress the entry of foreign matter into the exterior member and to suppress generation of wind noise during traveling of the vehicle.

In the sensor mounting structure according to the aspect, the exterior member may be a fender panel.

According to the aspect, it is possible to detect information on the right or left outer surroundings of the vehicle by the sensor.

In the sensor mounting structure according to the aspect, a color of the cover and a color of the exterior member may be the same or similar to each other.

According to the aspect, since the cover and the exterior member are readily viewed as a single body, it is possible to improve design quality.

According to the aspects of the present disclosure, it is possible to suppress a decrease in the degree of freedom of design and suppress the increase in the product number of the sensor.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein.

DETAILED DESCRIPTION OF EMBODIMENTS

Hereinafter, an embodiment of the present disclosure will be described below with reference to the drawings.

First, referring to FIG. 1, a vehicle 100 including a side lidar device 6 according to the embodiment will be described.

Figure 1:
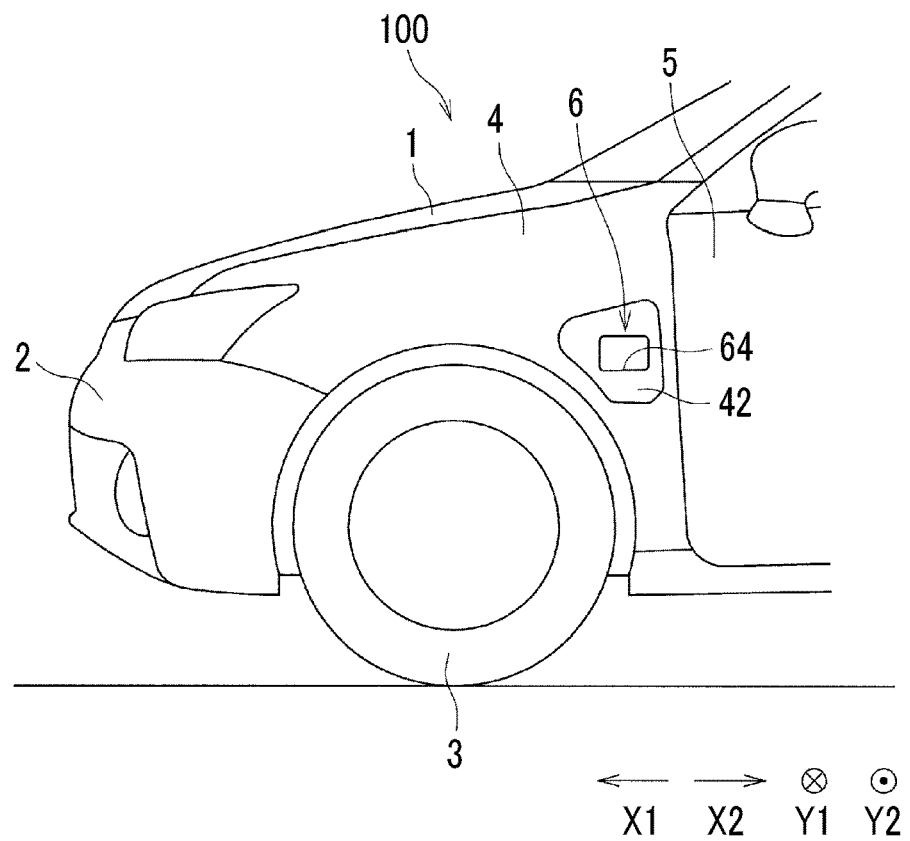
FIG. 1 is a side view showing an example of a vehicle including a side lidar device according to an embodiment.

As shown in FIG. 1, the vehicle 100 includes a hood 1, a bumper 2, a front wheel 3, a fender panel 4, a side door 5, and the like. The hood 1 is provided above the engine compartment (not shown) so as to be opened and closed. The bumper 2 is formed so as to extend in a width direction of the vehicle (Y1 and Y2 directions) at the front end portion (the end portion in the X1 direction) of the vehicle 100. The front wheel 3, the fender panel 4, and the side door 5 are provided in pairs on both end portions in the vehicle width direction. The fender panel 4 is disposed around the front wheel 3 when viewed in the vehicle width direction. The fender panel 4 is made of, for example, an aluminum alloy, and is attached to a vehicle body frame of the vehicle 100. The side door 5 is provided to open and close the vehicle at a door opening, and is connected to an A-pillar (not shown) via a hinge. The fender panel 4 is an example of the "exterior member".

Further, the vehicle 100 includes a side lidar device 6 and a rear lidar device 7 (see FIG. 4) for detecting information on the vicinity of the vehicle, and is configured to execute autonomous driving based on the detection results and the like. Examples of the autonomous driving include at least one of autonomously causing the vehicle 100 to travel without depending on the operation of the driver, and assisting driving by assisting the driver's operation.

Side Lidar Device

Figure 2:
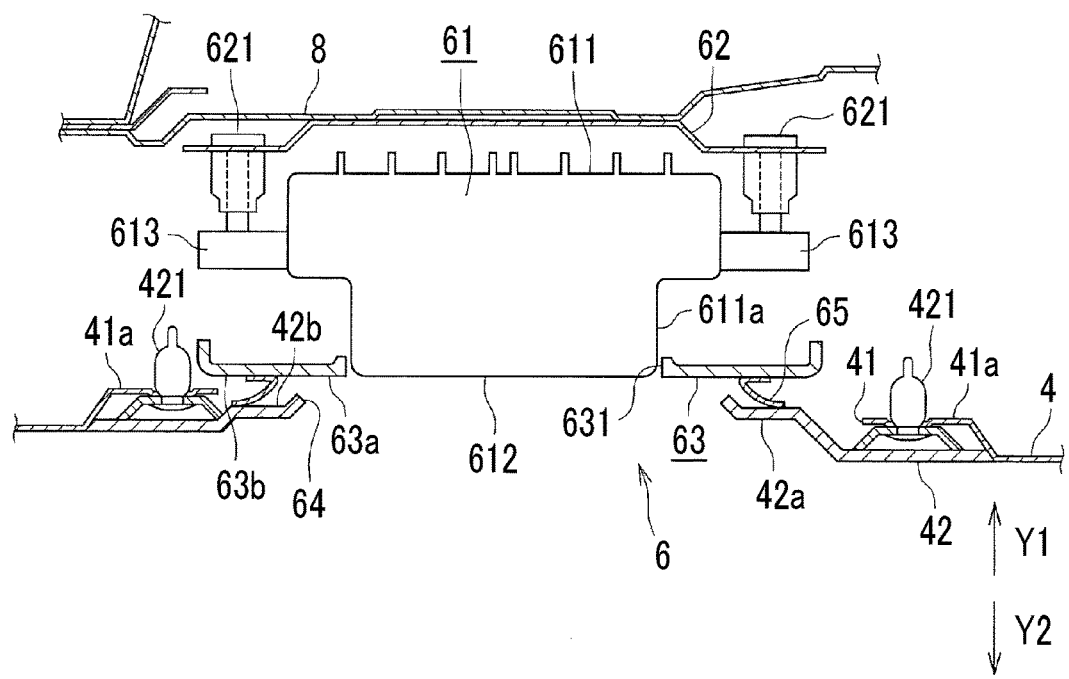
FIG. 2 is a sectional view showing the side lidar device according to the embodiment.
Figure 3:
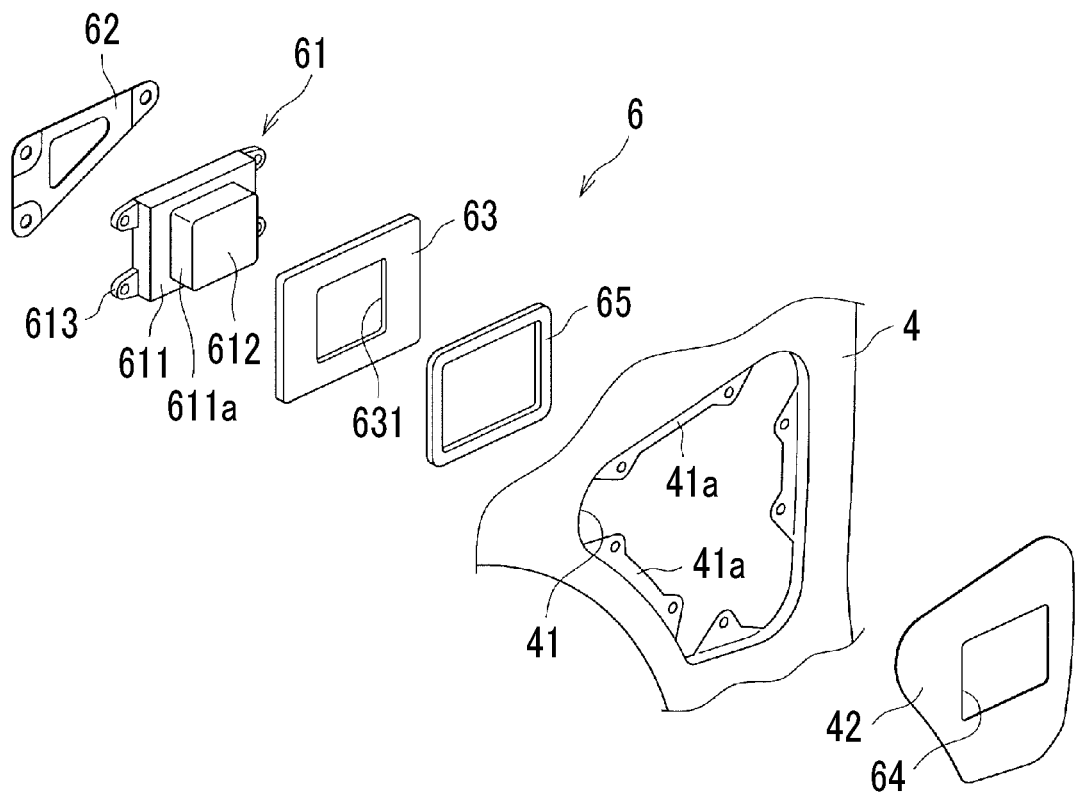
FIG. 3 is an exploded perspective showing the side lidar device in FIG. 2.

Next, with reference to FIGS. 2 and 3, the side lidar device 6 according to the embodiment will be described.

In order to detect information on the right or left outer surroundings of the vehicle, the side lidar device 6 is provided at both end portions in the vehicle width direction, where the two side lidar devices form a pair. In the following description, the left side lidar device 6 of the pair will be described. Since the right side lidar device 6 is configured similarly to the left side lidar device, the description of the right side lidar device will not be repeated. Further, the side lidar device 6 is an example of the "sensor mounting structure".

The side lidar device 6 is disposed so as to face the outside of the vehicle 100 in the vehicle width direction (Y2 direction) from the fender panel 4. As shown in FIGS. 2 and 3, the side lidar device 6 includes a sensor module 61, a bracket 62, a cover 63, an opening 64, and a weather strip 65. In FIG. 2, the internal structure of the sensor module 61 is not illustrated.

The sensor module 61 is configured to detect an object in the vicinity of the vehicle side. The sensor module 61 includes a laser oscillator (not shown) that emits a laser beam, a photo detector (not shown) that detects reflected light of the laser beam with the object, a case 611 that houses the laser oscillator and the photo detector, and the like. The case 611 is provided with a detection surface 612 through which a laser beam is transmitted. The sensor module 61 is configured to detect an object by allowing the laser beam from the laser oscillator to be emitted through the detection surface 612 outside the case 611, and allowing the reflected light of the laser beam reflected from the object to enter the photo detector through the detection surface 612. The detection surface 612 is formed to be flat, for example, and is formed in a rectangular shape when viewed from the vehicle width direction. The sensor module 61 is an example of the "sensor".

The bracket 62 is provided for mounting the sensor module 61 to the vehicle 100. The bracket 62 is made of, for example, metal, and is joined to a cowl side panel 8. In the vehicle width direction, the cowl side panel 8 is disposed outward of a cowl panel (not shown) extending in the vehicle width direction, and is disposed forward of the A-pillar in a vehicle front-rear direction. Further, the cowl side panel 8 is disposed inward of the fender panel 4 in the vehicle width direction (the Y1 direction). A flange portion 613 is provided on the case 611 of the sensor module 61, and the flange portion 613 is attached to the bracket 62 by a bolt 621. That is, the sensor module 61 is fixed to the vehicle body frame through the bracket 62. In the sensor module 61 attached to the bracket 62, the detection surface 612 faces the outside in the vehicle width direction. The cowl side panel 8 is an example of the "body".

The cover 63 is an extended dummy member formed by simulating the detection surface 612 and is disposed around the detection surface 612. The cover 63 is made of, for example, resin, and is formed in a rectangular plate shape. A hole 631 is formed at the center of the cover 63 such that a portion 611a on the detection surface side of the case 611 is inserted into the hole 631. The hole 631 has a rectangular shape and is formed to have the same size as the portion 611a on the detection surface side (in this specification, "the same size" includes "substantially the same size" in its meaning). Therefore, in the hole 631, the portion 611a on the detection surface side of the case 611 is inserted to be in a state without a gap therebetween (in this specification, "a state without a gap" includes "a state substantially without a gap" in its meaning).

Further, the cover 63 is attached to the case 611 and disposed so as to be flush with the detection surface 612. The cover 63 is formed to conform to the detection surface 612, and the tangential directions of the adjacent ends of the cover 63 and the detection surface 612 are coincident with each other. The color of the cover 63 and the color of the detection surface 612 are substantially the same and are the same black (in this specification, "the same black" includes "substantially the same black" in its meaning). Therefore, the cover 63 and the detection surface 612 are readily viewed as a single body. The attaching structure for attaching the cover 63 to the case 611 is not shown.

The opening 64 is disposed in the fender panel 4 so as to expose the detection surface 612. Specifically, an opening 41 is formed in the fender panel 4, and a flange portion 41a is formed on the peripheral edge of the opening 41. A garnish 42 is attached to the flange portion 41a, and the opening 64 is formed in the garnish 42. The garnish 42 is attached to the flange portion 41a by a clip 421. The flange portion 41a is disposed inward of the fender panel 4 in the vicinity of the opening 41 in the vehicle width direction, and the garnish 42 attached to the flange portion 41a is flush with the fender panel 4. A recessed portion 42a that is recessed inward in the vehicle width direction is formed around the opening 64 of the garnish 42. The opening 64 is an example of the "opening".

In addition, the opening 64 is rectangular when viewed in the vehicle width direction, and the area of the opening is formed to be wider than the outer shape of the detection surface 612. The detection surface 612 is disposed in the opening 64, and the detection surface 612 is exposed to the outside through the opening 64. That is, the entire area of the detection surface 612 is disposed in the opening 64 when viewed in the vehicle width direction. Further, the inner portion 63a of the cover 63 is exposed from the opening 64, and the outer portion 63b of the cover 63 is disposed to face the inner surface 42b of the garnish 42. That is, the cover 63 includes the inner portion 63a and the outer portion 63b, and is formed to close, with the inner portion 63a, the space between the outer peripheral edge of the detection surface 612 and the opening edge of the opening 64 when viewed in the vehicle width direction. The inner portion 63a and the outer portion 63b are rectangular annular when viewed in the vehicle width direction, the inner portion 63a is disposed around the hole 631, and the outer portion 63b is disposed at the outer edge of the inner portion 63a.

The weather strip 65 is provided to suppress entry of foreign matter into the engine compartment. The weather strip 65 is formed in a rectangular annular shape and is disposed between the outer portion 63b of the cover 63 and the inner surface 42b of the garnish 42. The weather strip 65 is attached to, for example, the cover 63. It is to be noted that the weather strip 65 is an example of a "sealing member".

Here, the fender panel 4 is attached to the vehicle body frame, where the gap between the fender panel 4 and the hood 1 and the gap between the fender panel 4 and the side door 5 is adjusted. Therefore, the attachment position of the fender panel 4 to the vehicle body frame is likely to vary for each vehicle 100 that has been manufactured. As the attachment position of the fender panel 4 to the vehicle body frame varies, the position of the opening 64 with respect to the sensor module 61 varies. In the embodiment, the cover 63 is disposed around the detection surface 612 of the sensor module 61, such that the garnish 42 does not enter the area through which the laser beam passes, even if the position of the opening 64 varies. That is, by disposing the cover 63, variations in the position of the opening 64 with respect to the sensor module 61 can be allowed (absorbed).

Rear Lidar Device

Figure 4:
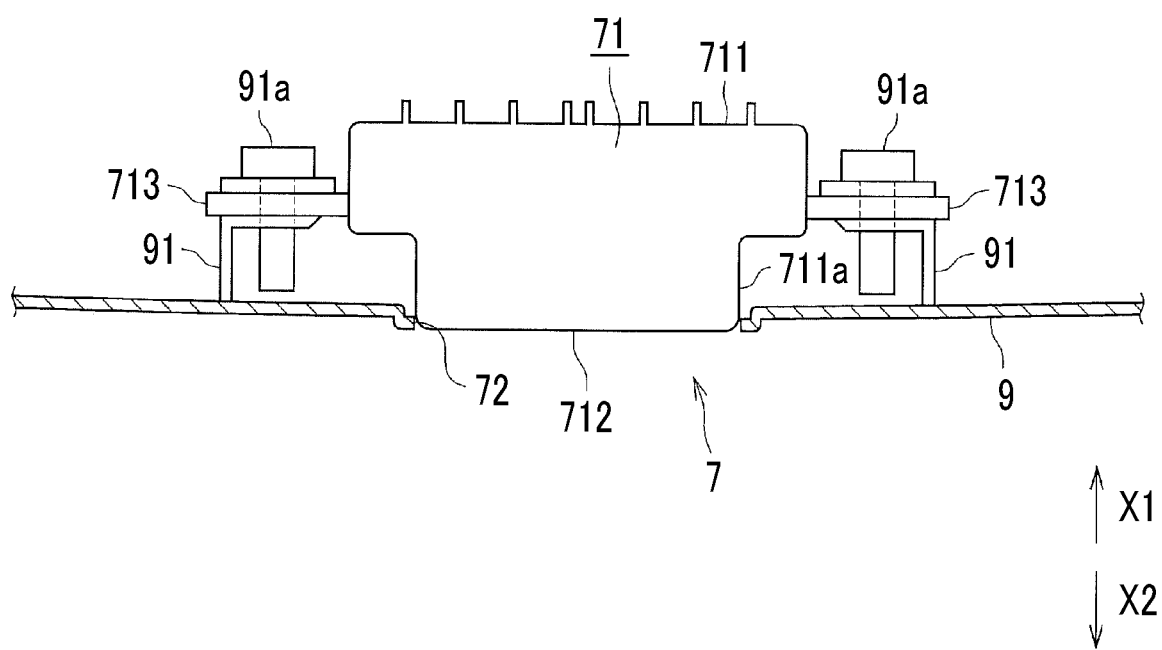
FIG. 4 is a sectional view showing a rear lidar device of the vehicle.

Hereinafter, the rear lidar device 7 will be described with reference to FIG. 4.

The rear lidar device 7 is disposed at the rear end portion of the vehicle 100 to detect information behind the vehicle. As shown in FIG. 4, the rear lidar device 7 includes a sensor module 71 and an opening 72, and is disposed to face behind of the vehicle from a rear bumper cover 9 (X2 direction). The rear bumper cover 9 is made of, for example, resin, and is formed to extend in the vehicle width direction at the rear end portion of the vehicle 100. In FIG. 4, the internal structure of the sensor module 71 is not illustrated.

The sensor module 71 is disposed at the center of the rear bumper cover 9 in the vehicle width direction and is configured to detect an object behind the vehicle. The sensor module 71 is configured in the same manner as the above-described sensor module 61, and has the same product number as the sensor module 61, for example. The sensor module 71 includes a case 711, and a detection surface 712 and a flange portion 713 are formed in the case 711.

An opening 72 is formed in the rear bumper cover 9 to expose the detection surface 712. The opening 72 is rectangular when viewed from the rear side of the vehicle, and is configured to allow a portion 711a on the detection surface side of the case 711 to be inserted. In the opening 72, the portion 711a on the detection surface side of the case 711 is inserted in a state in which there is substantially no gap. The detection surface 712 is disposed in the opening 72, and the detection surface 712 is exposed to the outside through the opening 72.

An L-shaped attaching portion 91 is formed around the opening 72 of the rear bumper cover 9. The attaching portion 91 is disposed inside the rear bumper cover 9, and a flange portion 713 is attached to the attaching portion 91 by a bolt 91a. That is, the sensor module 71 is mounted to the rear bumper cover 9 having the opening 72 formed therein. Therefore, since the position of the sensor module 71 is difficult to vary with respect to the opening 72, the cover 63 is not disposed in the rear lidar device 7 unlike the side lidar device 6.

Effects

In the embodiment, as described above, when the detection surface 612 is disposed in the opening 64, the detection surface 612 is exposed to the outside, which makes it possible to suppress a reduction in sensitivity. Further, by making the opening 64 wider than the outer shape of the detection surface 612 and closing the space between the outer peripheral edge of the detection surface 612 and the opening edge of the opening 64 with the cover 63, it is not necessary to match the shape of the detection surface 612 to the opening 64. Therefore, the common sensor module 61 can be used, and accordingly, the increase in the product number of the sensor module 61 can be suppressed. For example, the sensor module 61 of the side lidar device 6 and the sensor module 71 of the rear lidar device 7 can have the same product number. That is, even when the external appearance (opening shape) of the side lidar device 6 and the rear lidar device 7 are different from each other, it is possible to reduce the size of the sensor modules 61, 71 and use a common sensor for the sensor modules 61, 71. Therefore, an increase in the manufacturing cost can be suppressed. In addition, since the opening 64 can be formed in a desired shape regardless of the shape of the detection surface 612, it is possible to suppress a decrease in the degree of freedom of design.

In addition, in the embodiment, since the sensor module 61 is fixed to the vehicle body frame having high rigidity by mounting the sensor module 61 to the cowl side panel 8, vibration of the sensor module 61 can be suppressed.

Further, in the embodiment, by forming the cover 63 conforming to the detection surface 612, no step is formed at the boundary between the detection surface 612 and the cover 63, and thus the detection surface 612 and the cover 63 are readily viewed as a single body. As a result, design quality can be improved.

Further, in the embodiment, by making the color of the cover 63 and the color of the detection surface 612 substantially the same, the detection surface 612 and the cover 63 are readily viewed as a single body. As a result, design quality can be improved.

Further, in the present embodiment, since the cover 63 is fixed to the sensor module 61 by attaching the cover 63 to the sensor module 61, vibration of the cover 63 can be suppressed.

Further, in the embodiment, by providing the weather strip 65 between the outer portion 63b of the cover 63 and the inner surface 42b of the garnish 42, it is possible to suppress the entry of foreign matter into the engine compartment and suppress generation of wind noise during traveling of the vehicle. Further, noise emission from the inside of the engine compartment to the outside of the vehicle can be suppressed.

Further, in the embodiment, information on the right or left outer surroundings of the vehicle can be detected by disposing the opening 64 in the fender panel 4 and disposing the detection surface 612 of the sensor module 61 in the opening 64. Further, although the attachment position of the fender panel 4 easily varies with respect to the vehicle body frame, variations in the position of the opening 64 with respect to the sensor module 61 can be allowed (absorbed) by the cover 63.

Other Embodiments

The embodiment disclosed in the specification is an example in all respects and is not a basis for a limited interpretation. Therefore, the technical scope of the present disclosure may be interpreted by the above-described embodiment, and may be interpreted by every possible embodiment that can be defined based on the description of the claims, as well. Also, the technical scope of the present disclosure embraces all equivalents to claims and all changes within the scope.

For example, in the embodiment, an example in which the present disclosure is applied to the side lidar device 6 is shown, but an applicable embodiment of the present disclosure is not limited thereto, and the present disclosure may be applied to a radar device, a sonar device, a camera device, and the like. That is, the present disclosure may be applied to a mounting structure for a radar sensor that detects information on the vicinity of the vehicle by using radio waves, or the present disclosure may be applied to a mounting structure for a sonar sensor that detects information on the vicinity of the vehicle by using ultrasonic waves, or the present disclosure may be applied to a mounting structure for an image sensor that images the vicinity of the vehicle.

Further, in the embodiment, an example in which the present disclosure is not applied to the rear lidar device 7 is shown, but an applicable embodiment of the present disclosure is not limited thereto. The present disclosure may be applied to the rear lidar device.

In the embodiment, the opening 64 is disposed in the fender panel 4, which is an example of the exterior member (outer panel) of the vehicle 100, but an applicable embodiment of the present disclosure is not limited thereto. The opening may be disposed in exterior members of other vehicles such as a side outer panel and a bumper cover.

Further, in the embodiment, the example in which the garnish 42 is provided on the fender panel 4 and the opening 64 is formed in the garnish 42 is shown, but an applicable embodiment of the present disclosure is not limited thereto. The opening may be formed in the fender panel without providing the garnish.

In the embodiment, the sensor module 61 is fixed to the vehicle body frame through the bracket 62, but an applicable embodiment of the present disclosure is not limited thereto. The sensor module may be mounted to an exterior member such as the fender panel.

In the embodiment, the cover 63 is attached to the sensor module 61, but an applicable embodiment of the present disclosure is not limited thereto. The cover may be disposed on an exterior member such as the fender panel.

Figure 5:
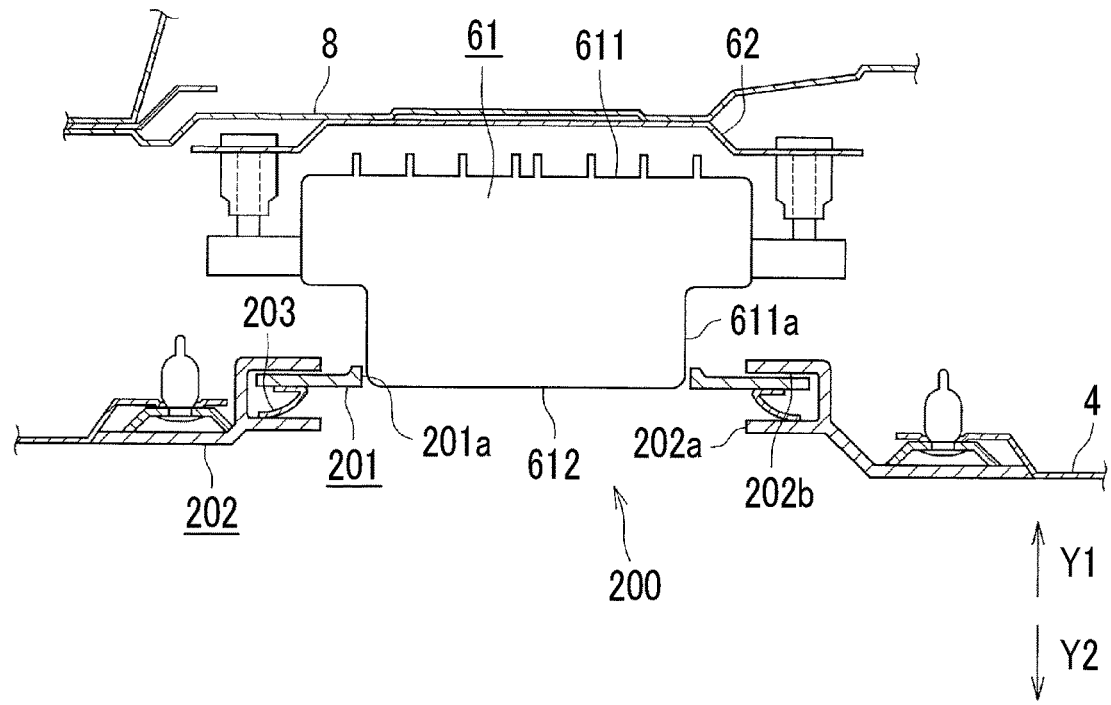
FIG. 5 is a sectional view showing a side lidar device according to a first modification example of the embodiment.

For example, as in a side lidar device 200 according to a first modification example shown in FIG. 5, a cover 201 may be movably disposed on a garnish 202. An opening 202a is formed in the garnish 202 and a fitting groove 202b, in which the cover 201 is fitted, is formed around the opening 202a. The cover 201 has a hole 201a into which a portion 611a of the case 611 on detection surface side is inserted, and is configured to be movable in the fitting groove 202b as the position of the case 611 moves. In the fitting groove 202b, a weather strip 203 is provided. The side lidar device 200 is an example of the "sensor mounting structure", the opening 202a is an example of the "opening", and the weather strip 203 is an example of the "sealing member".

Figure 6:
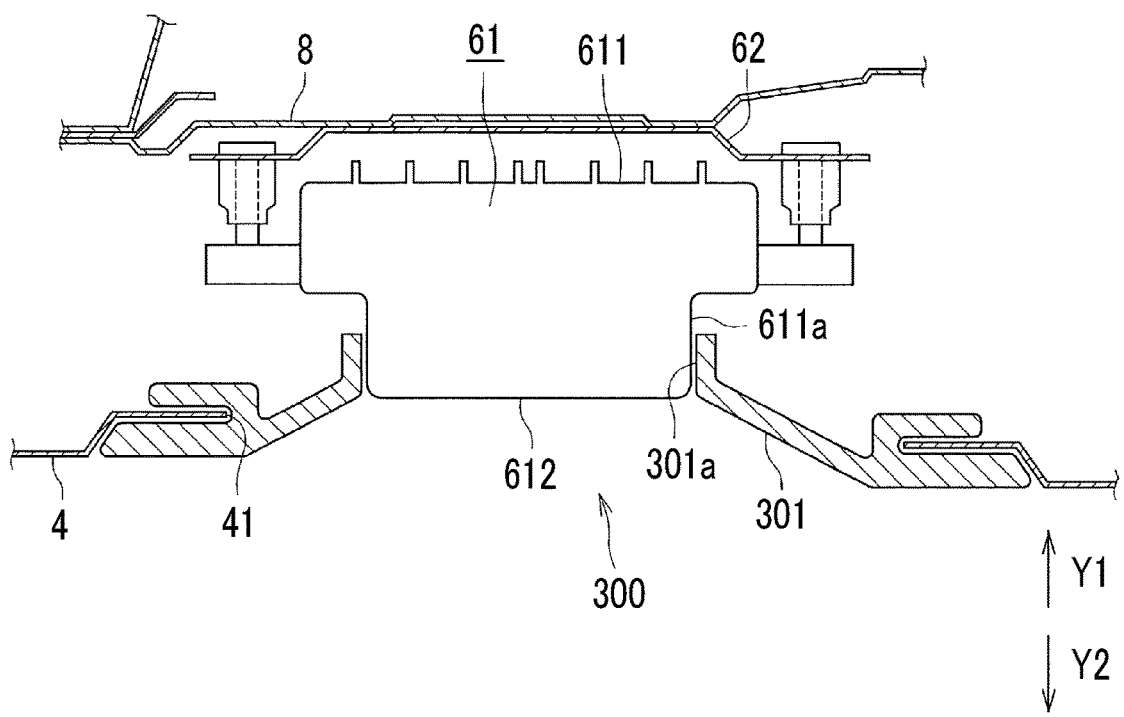
FIG. 6 is a sectional view showing a side lidar device according to a second modification example of the embodiment.

Further, as in a side lidar device 300 according to a second modification example shown in FIG. 6, a cover 301 may be deformably provided on the fender panel 4. The cover 301 is made of an elastomer such as elastically deformable rubber and is attached to the opening 41 of the fender panel 4. The cover 301 has a hole 301a into which a portion 611a of the case 611 on the detection surface side is inserted. Then, the cover 301 is deformed as the position of the case 611 moves to adjust the position of the hole 301a. The side lidar device 300 is an example of the "sensor mounting structure", and the opening 41 is an example of the "opening".

In the embodiment, the detection surface 612 has a rectangular shape, but an applicable embodiment of the present disclosure is not limited thereto. The detection surface may have another shape such as a circular shape.

In the embodiment, the detection surface 612 is shown to be flat, for example, but the detection surface is not limited thereto. The detection surface may be curved in a spherical shape or an arc shape.

Further, in the embodiment, the detection surface 612 may be formed of a lens.

Figure 7:
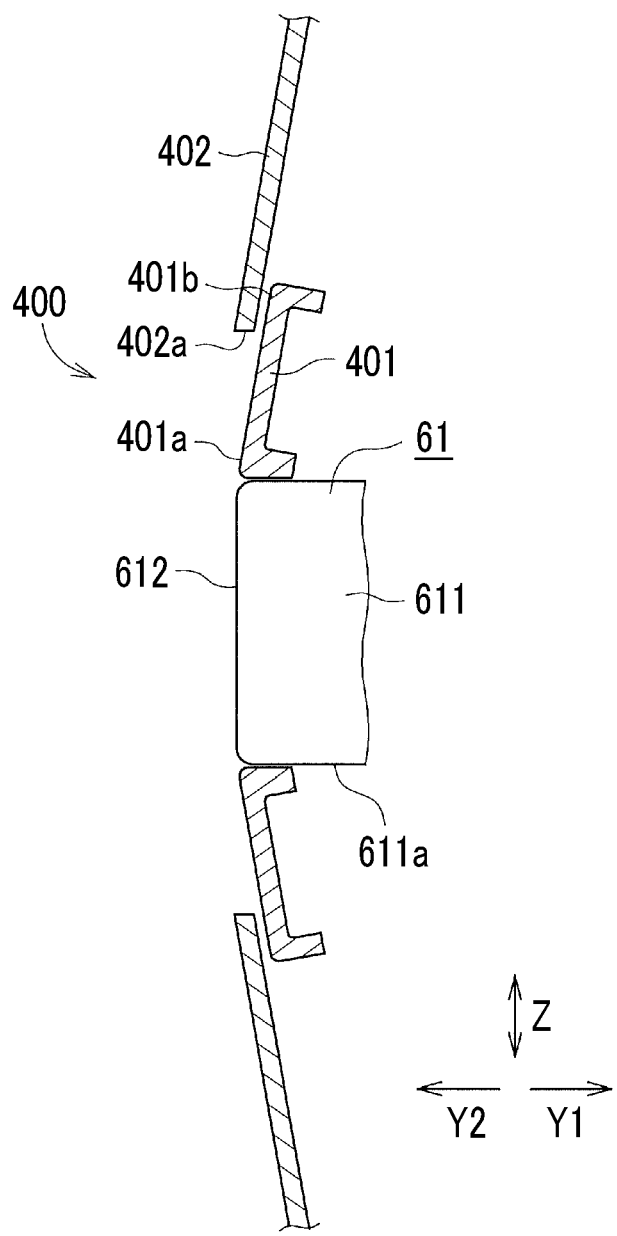
FIG. 7 is a sectional view showing a side lidar device according to a third modification example of the embodiment.

In the embodiment, the detection surface 612 and the cover 63 are flush with each other, but an applicable embodiment of the present disclosure is not limited thereto. In a side lidar device 400 according to a third modification example shown in FIG. 7, the cover 401 may be inclined. The cover 401 is formed to be inclined toward the opening edge of the opening 402a of the fender panel 402, from the outer peripheral edge of the detection surface 612 of the sensor module 61. Specifically, the fender panel 402 is curved when viewed in the front-rear direction of the vehicle, and the cover 401 is formed to conform to the fender panel 402. That is, the cover 401 is inclined such that a portion 401b that is relatively distant from the sensor module 61 in a vertical direction of the vehicle (Z direction) is disposed inward of the portion 401a that is relatively close to the sensor module 61 in the vertical direction of the vehicle, in the vehicle width direction (the Y1 direction). The portion 401b of the cover 401 that is relatively distant from the sensor module 61 is disposed inward of the fender panel 402 in the vehicle width direction. With the configuration, since the step at the boundary (the opening 402a) between the cover 401 and the fender panel 402 is suppressed, the outer shape can be smoothed. The side lidar device 400 is an example of the "sensor mounting structure", and the opening 402a is an example of the "opening".

Figure 8:
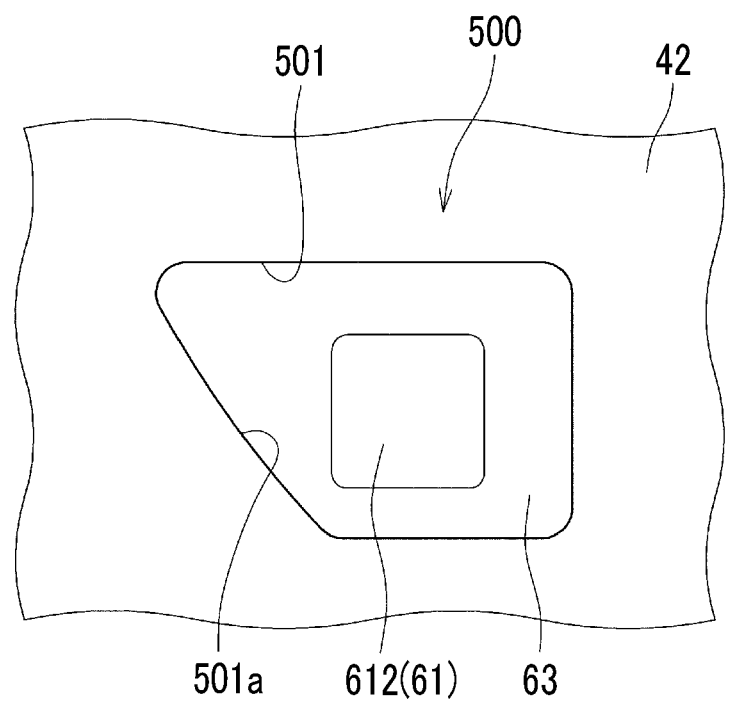
FIG. 8 is a view of a side lidar device according to a fourth modification example of the embodiment as seen from the side of the vehicle.

In the embodiment, the opening 64 has a rectangular shape, but an applicable embodiment of the present disclosure is not limited thereto. The opening may have another shape such as a circular shape. For example, as in a side lidar device 500 according to a fourth modification example shown in FIG. 8, an opening 501 may have a trapezoidal shape. That is, the opening 501 may be formed asymmetrically in the vehicle front-rear direction. In the opening 501, a side 501a on the front side of the vehicle is inclined so as to conform to the front wheel. The side lidar device 500 is an example of the "sensor mounting structure", and the opening 501 is an example of the "opening".

Further, in the embodiment, the example in which the color of the cover 63 and the color of the detection surface 612 are substantially the same is shown, but an applicable embodiment of the present disclosure is not limited thereto. The color of the cover and the color of the detection surface may be substantially the same, or the color of the cover and the color of the detection surface may be substantially similar to each other. Also, the cover and the detection surface may have different colors.

In the embodiment, the example in which the color of the cover 63 and the color of the detection surface 612 are substantially the same, that is, black is shown, but an applicable embodiment of the present disclosure is not limited thereto. The cover and the detection surface may have any color other than black. In this case, the color of the cover and the color of the detection surface may be substantially the same or similar to each other, or the cover and the detection surface may have different colors.

Further, in the embodiment, the cover 63 and the detection surface 612 may be opaque so as not to transmit visible light, and at least one of the cover 63 and the detection surface 612 may be transparent to transmit visible light. For example, the cover 63 may be opaque black and the detection surface 612 may be transparent black.

Further, in the embodiment, the cover 63 and the detection surface 612 may be made of the same material, for example, resin, and the cover 63 and the detection surface 612 may have the same color when they are made of the same material. Also, the cover 63 and the detection surface 612 may have different materials. For example, one of the cover 63 and the detection surface 612 may be formed of a transparent material, and the other of the cover 63 and the detection surface 612 may be formed of an opaque material. The resin may be colored, for example, by adding a colorant or the like. Further, when the cover 63 and the detection surface 612 are made of different materials, in order to make the cover 63 and the detection surface 612 easy to be readily recognized as a single body in design when viewed from the outside of the vehicle, toning may be applied to the cover 63 and the detection surface 612, such that colors of the cover 63 and the detection surface 612 are close to the same color.

Further, in the embodiment, the same paint may be applied to the surfaces of the cover 63 and the detection surface 612 such that the surfaces have the same color.

Further, in the embodiment, gradation may be formed by changing tones of the cover 63 and the detection surface 612.

Further, in the embodiment, the detection surface 612 may be made of a plurality of materials. For example, the detection surface 612 may be made of a transparent material and an opaque material.

Further, in the embodiment, the fender panel 4 including the garnish 42 and the cover 63 may have substantially the same color or a similar color. With the configuration, since the fender panel 4 and the cover 63 are readily viewed as a single body, it is possible to improve design quality. The color of the fender panel 4 and the color of the cover 63 may be substantially the same, or the color of the fender panel 4 and the color of the cover 63 may be different from each other.

Further, in the embodiment, the fender panel 4 and the cover 63 may be made of the same material, for example, resin, and the fender panel 4 and the cover 63 may have the same color when they are made of the same material. In addition, the materials of the fender panel 4 and the cover 63 may be different. For example, one of the fender panel 4 and the cover 63 may be formed of a transparent material, and the other of the fender panel 4 and the cover 63 may be formed of an opaque material. The resin may be colored, for example, by adding a colorant or the like. Further, when the fender panel 4 and the cover 63 are made of different materials, in order to make the fender panel 4 and the cover 63 integrally recognized in design as viewed from the outside of the vehicle, toning may be applied to the fender panel 4 and the cover 63, such that colors of the fender panel 4 and the cover 63 are close to the same color.

Further, in the embodiment, the same paint may be applied to the surfaces of the fender panel 4 and the cover 63 such that the surfaces have the same color.

Further, in the embodiment, gradation may be formed by changing tones of the fender panel 4 and the cover 63.

Further, in the above embodiment, the materials of the fender panel 4 and the garnish 42 may be the same or different. Further, the color of the fender panel 4 and the color of the garnish 42 may be the same or different from each other.

In the embodiment, the example in which the weather strip 65 is attached to the cover 63, but an applicable embodiment of the present disclosure is not limited thereto. The weather strip may be attached to the inner surface of the garnish.

In the embodiment, the weather strip (not shown) may be provided between the sensor module 61 and the cover 63.

It should be noted that each of the modification examples described above may be combined as appropriate.

The present disclosure can be used in the sensor mounting structure for a sensor having a detection surface configured to detect information around the vehicle.

What is claimed is:

1. A sensor mounting structure for a sensor having a detection surface configured to detect information around a vehicle, the sensor mounting structure comprising:
   an exterior member of the vehicle provided with an opening that is provided to be wider than an outer shape of the detection surface, the opening being provided such that an opening edge of the opening is disposed around the detection surface with a space between the opening edge and the detection surface;

a first mounting structure configured to mount the sensor such that the detection surface of the sensor is oriented within the opening so as to face outside of the vehicle and the detection surface is disposed inward with respect to an outer surface of the exterior member of the vehicle, such that the detection surface is not on the outer surface of the exterior member; and a cover disposed around the detection surface to close the space between an outer peripheral edge of the detection surface and the opening edge of the opening.

2. The sensor mounting structure according to claim 1, wherein the opening is disposed around the detection surface of the sensor attached to a body of the vehicle.

3. The sensor mounting structure according to claim 1, wherein the cover is provided to conform to the detection surface.

4. The sensor mounting structure according to claim 3, wherein the cover is provided to be inclined toward the opening edge of the opening from the outer peripheral edge of the detection surface.

5. The sensor mounting structure according to claim 1, wherein a color of the cover and a color of the detection surface are the same or similar to each other.

6. The sensor mounting structure according to claim 1, wherein:

the cover is provided in a plate shape;

the cover includes a hole into which the sensor is inserted; and the cover is attached to the sensor through the hole.

7. The sensor mounting structure according to claim 1, wherein:

the cover includes an inner portion that is exposed from the opening and an outer portion that faces an inner surface of the exterior member; and the cover includes a sealing member that is disposed between the outer portion of the cover and the inner surface of the exterior member.

8. The sensor mounting structure according to claim 1, wherein the exterior member is a fender panel.

9. The sensor mounting structure according to claim 1, wherein a color of the cover and a color of the exterior member are the same or similar to each other.

* * * * *